United States Patent [19]
Takahira et al.

[11] Patent Number: 5,539,399
[45] Date of Patent: Jul. 23, 1996

[54] DISPLAY DEVICE FOR ELECTRIC VEHICLE

[75] Inventors: Yoshikazu Takahira; Tomoko Ogawa; Shinichiro Kanayama, all of Saitama, Japan

[73] Assignee: Honda Giken Kogyo Kabushiki Kaisha, Tokyo, Japan

[21] Appl. No.: 283,588

[22] Filed: Aug. 1, 1994

[30]     Foreign Application Priority Data

Sep. 17, 1993 [JP] Japan .................................. 5-265379

[51] Int. Cl.⁶ .................................................. G08G 1/123
[52] U.S. Cl. ...................... 340/995; 340/988; 340/990; 340/636; 364/444; 364/483
[58] Field of Search ................................. 340/988, 990, 340/995, 636; 364/444, 483

[56]             References Cited

U.S. PATENT DOCUMENTS 5,352,982  10/1994  Nakazawa et al. .................... 364/483

FOREIGN PATENT DOCUMENTS

| | | |
|---|---|---|
| 56-42899 | 4/1981 | Japan . |
| 60-79500 | 5/1985 | Japan . |
| 60-230013 | 11/1985 | Japan . |
| 60-224022 | 11/1985 | Japan . |
| 0230013 | 11/1985 | Japan . |
| 4368401 | 12/1992 | Japan . |

Primary Examiner—Brent A. Swarthout
Assistant Examiner—Benjamin C. Lee
Attorney, Agent, or Firm—Lyon & Lyon

[57]            ABSTRACT

A display device for an electric vehicle, which display device is capable of displaying a possible running range from a current location of a vehicle with a detected residual battery charge on a road map indicated on the display device screen, considering the climbing power of the vehicle with that detected residual battery charge. The display device operates to indicate a current location of the vehicle on the road map shown on the display screen according to map information read from a storage medium according to a detected current location of the vehicle, to determine a possible running distance of the vehicle with a detected residual battery charge on the basis of electric energy consumption rate for each road on the road map in consideration of topographic features of each road, and then to display a possible running range of the vehicle starting from the current location of the vehicle on the road map.

11 Claims, 7 Drawing Sheets

DISPLAY DEVICE FOR ELECTRIC VEHICLE

BACKGROUND OF THE INVENTION

The present invention relates to a display device For use in an electric vehicle, which is capable of indicating a possible running range whereto the vehicle can reach with a currently remaining charge of the vehicle's battery, together with its current location on a road map displayed on a display screen.

Japanese laid-open patent publication No. 60-230013 discloses a display device that is used in a vehicle travel-guiding device for displaying a current location of the vehicle on a road map indicated on a display screen on the basis of a road map information read from storage medium by means of detecting a running distance and a running direction of the vehicle and determining a current location in a two-dimensional coordinate system. Further, that system is intended to determine a remaining quantity of fuel in a fuel tank, to determine a possible running distance therefrom on the basis of fuel consumption, to indicate a limit radius representing a possible running distance from the current location of the vehicle on the road map, to read data of previously registered fuel or gas (filling) stations existing within the area of the limit radius, and indicate them on the road map displayed on the display screen.

Japanese laid-open patent publication No. 4-368401 also discloses a battery-charge meter that detects a residual charge of a battery of an electric vehicle and indicates the measured residual charge on its display.

Problems to be solved are such that the prior art devices only measure and indicate a residual charge of a battery of an electric vehicle, but they can not clearly advise a driver how far the vehicle may further travel with the residual battery charge.

It may be considered possible to detect a residual charge in a vehicle's battery, to calculate a possible running distance of the vehicle with the residual charge on the basis of consumption rate of the battery charge for a unit running distance, to determine therefrom a possible running range from the current location of the vehicle and to display it on a road map indicated on a display screen. However, in the case of an electric vehicle it is impossible to directly determine a possible running distance of the vehicle according to a residual battery charge because the battery charge consumption necessary for climbing a slope considerably differs from one necessary for running on a horizontal roadway and, furthermore, largely depends upon all inclination angle of a slope. For example, if the vehicle has a reduced battery charge, it may have a limited current to be instantly outputted and, thereby, can not climb an upward slope that is possible for the vehicle to climb at a normal level of its battery charge.

SUMMARY OF THE INVENTION

Accordingly, an object of the present invention is to provide a display device which is capable of setting a possible running range of a vehicle in due consideration of possible slope-climbing ability in accordance with a residual battery charge and displaying it on a road map indicated on a display screen by reading topographic feature information of each road from a storage medium, in which data for all roads of a road map are previously stored, determining a possible running distance on each road for the vehicle with a detected residual battery-charge on the basis of consumption of electric energy necessary for running on the road specified by its topographic features read from the storage medium, repeating the same step for each road and displaying the calculation results as a possible running range from the current location of the vehicle on the road map indicated on the display screen.

DESCRIPTIONS OF THE PREFERRED EMBODIMENT

The preferred embodiments of the present invention will now be described in detail by way of example and with reference to the accompanying drawings.

Figure 1:
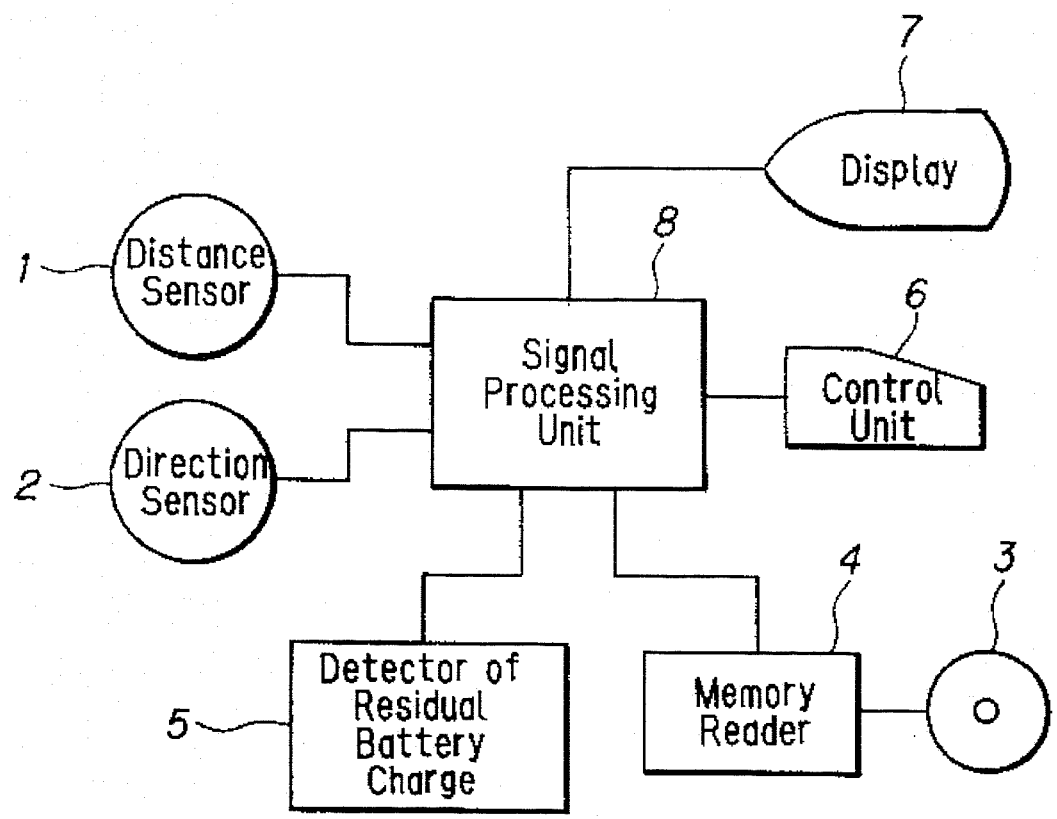
FIG. 1 is a block diagram of a display device for an electrical vehicle, which is an embodiment of the present invention.

FIG. 1 is illustrative of the diagrammatic structure of a display device for an electric vehicle according to the present invention. As shown in FIG. 1, the display device comprises a distance sensor 1 for detecting a running distance of the vehicle, a direction sensor 2 for detecting a running direction of the vehicle, a road-map information storage medium (CD-ROM) 3 wherein road map information and topographic data of mapped roads are stored, a memory reader 4 for selectively reading road map information and corresponding topographic information from the road map storage medium, a residual battery-charge detector 5 for detecting a residual charge in a battery of the vehicle and a signal processing unit 8 consisting of a microcomputer which performs specified arithmetic operations on detected signals from the sensors according to an input signal from a control unit 6 and controls corresponding portions to indicate a current location of the vehicle and a possible running range on a road map displayed on a screen of a display 7. In thus constructed display device, command signals for selecting a road map and a displaying scale of the map are entered from the control unit 6 into the signal processing unit 8, under the control of which the specified map information is read from the map information storage medium 3 and displayed at the specified scale on the screen of the display 7.

While the vehicle runs on the road from a start point preset on the map displayed according to the signal entered from the control unit 6, the signal processing unit 8 reads a currently detected distance signal from the distance sensor 1 and a currently detected direction signal from the direction sensor 2, and accumulatively determines a renewable current location of the vehicle for a unit running distance in a two-dimensional coordinate system.

It is needless to say that the current location of the vehicle also can be determined by electronic navigation system using a GPS.

Figure 2:
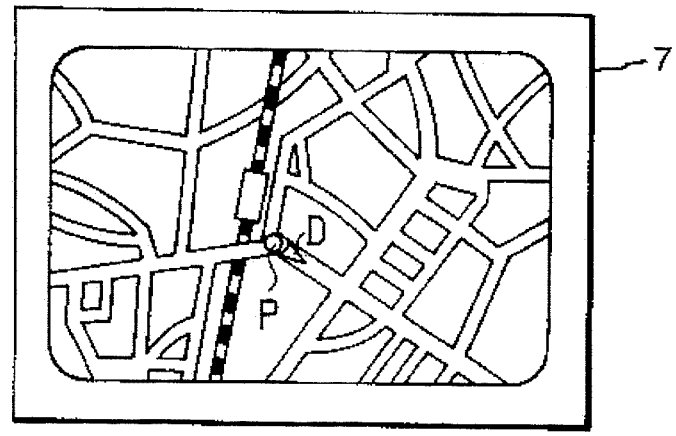
FIG. 2 shows a road map indicated on a display screen, wherein a current location of a vehicle is indicated.
Figure 3:
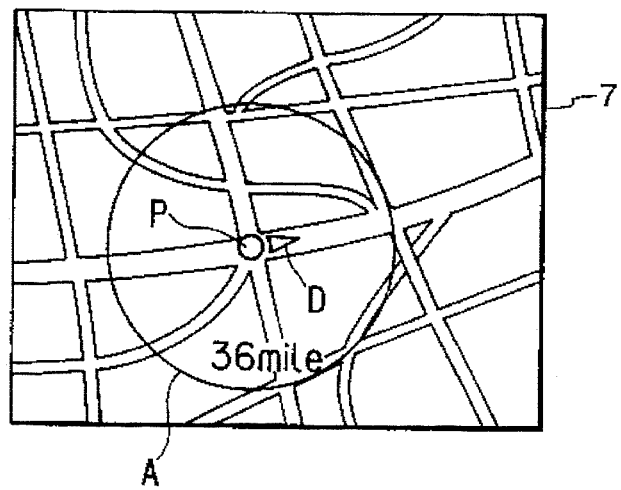
FIG. 3 shows a road map indicated on a display screen, whereon a boundary whereto a vehicle can reach is shown by a circle having a radius being a distance from a current location of the vehicle.

As the vehicle runs on the road, the signal processing unit 8 renewably indicates a current position P of the vehicle with a running direction mark D at the vehicle's current location on the road map displayed at the specified displaying scale on the display screen as shown in FIG. 2, The signal processing unit 8 successively reads a signal of a residual amount of the vehicle's battery charge detected by the residual charge detector 5. When the currently detected amount of the residual battery charge drops below a specified threshold, the signal processing unit 8 calculates a possible running distance of the vehicle with the residual battery charge on the basis of a given consumption rate of the battery charge. As shown in FIG. 3, the signal processing unit 8 digitally displays the calculated value of the possible running distance on the display screen and, at the same time, simply illustrates a circle representing a possible running range A from the current location P of the vehicle on the road map shown on the display screen.

When the signal processing unit 8 is given a command signal from the control unit 6 to display a detailed possible range of the vehicle with due consideration of slope-climbing ability at the residual battery charge, it determines the slope of each road on the road map according to topographic data read from the road map information storage medium 3 and the possible distance of roads, with the respective gradient values, which the vehicle can travel from the current position with its residual battery charge, by applying respective consumption rates of electric energy for the respective roads. Then, the signal processing unit 8 finally determines a possible running range of the vehicle from its current location on the basis of the calculated possible distances and displays it on the road map indicated on the display screen.

The topographic feature information containing elevation or gradient values of all roads existing on a road map is stored together with the road map information in the road-map information storage medium 3 or is separately stored in a specially designated storage medium.

Figure 4:
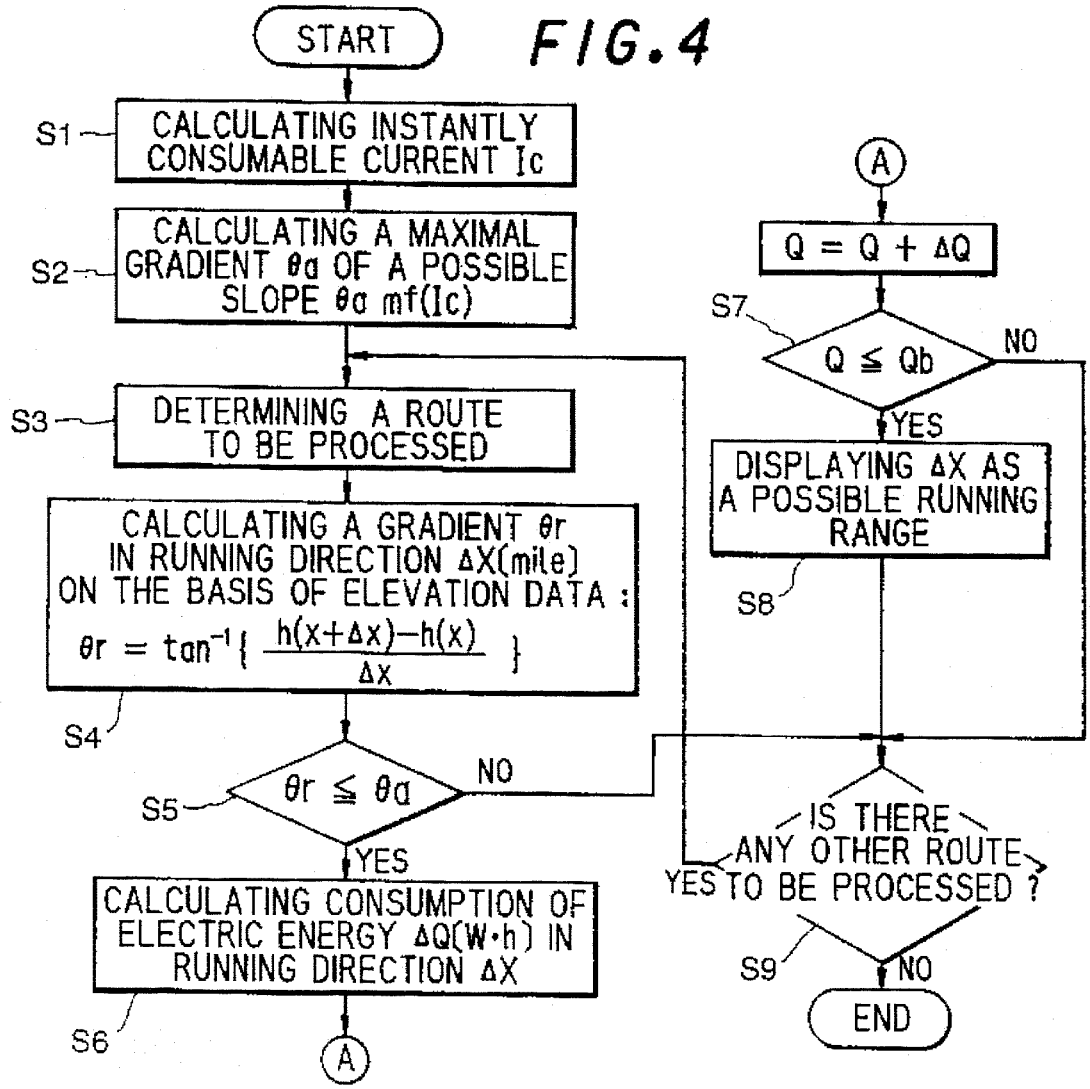
FIG. 4 is a flow chart of processing for displaying a possible running range of a vehicle depending on a residual charge of its battery.

Referring to FIG. 4, there is shown an example of the processing steps to be performed by the signal processing unit 8 to display a possible running range of a vehicle in due consideration of its slope-climbing ability at a specified residual battery charge.

Instantly consumable current Ic is first determined in step S1 from the detected residual amount of the battery charge and a maximal gradient θa of possible slope is then calculated in step S2 according to a preset function f(Ic):

$$\theta a = f(Ic) \tag{1}$$

A priority is given to a current running direction of the vehicle, i.e., a road whereon the vehicle currently travels is selected as a first route to be processed in step S3. A gradient θr of the road for a unit running distance Δx in the running direction is determined in step S4 on the basis of elevation data h(x) selected from the stored topographic feature information as follows:

$$\theta_r = \tan^{-1}[\{h(x+\Delta x) - h(x)\}/\Delta x] \tag{2}$$

A criterion is made whether θa≦θr or not in step S5. If so, an electric energy consumption ΔQ necessary for allowing the vehicle to travel a unit distance Δx of the road in its running direction is calculated in step S6.

Whenever the electric energy consumption ΔQ for a unit running distance Δx in the running direction of vehicle is accumulatively calculated, a criterion of Q≦Qb (a residual charge in the vehicle's battery) is checked in step S7 and, if so, the unit distance Δx is accumulatively added to the preceding sum till a possible running distance of the vehicle on the route is determined and displayed in step S8.

A route including a branch of road whereon the vehicle currently travels is selected as a second route to be processed in step S9 and similar cumulative calculation is conducted in steps S3 through S8 to determine a possible running distance along the second route.

After possible distances forward from the current location of the vehicle on all branched routes on the road map are calculated, a road which leads in the direction reverse to the currently running direction of the vehicle is selected in step S9 as a route to be processed and then a possible running distance from the current location P of the vehicle along the selected route is calculated. Then, possible running distances of the vehicle on all branched routes directed in reverse to the currently running direction are successively determined.

Figure 5:
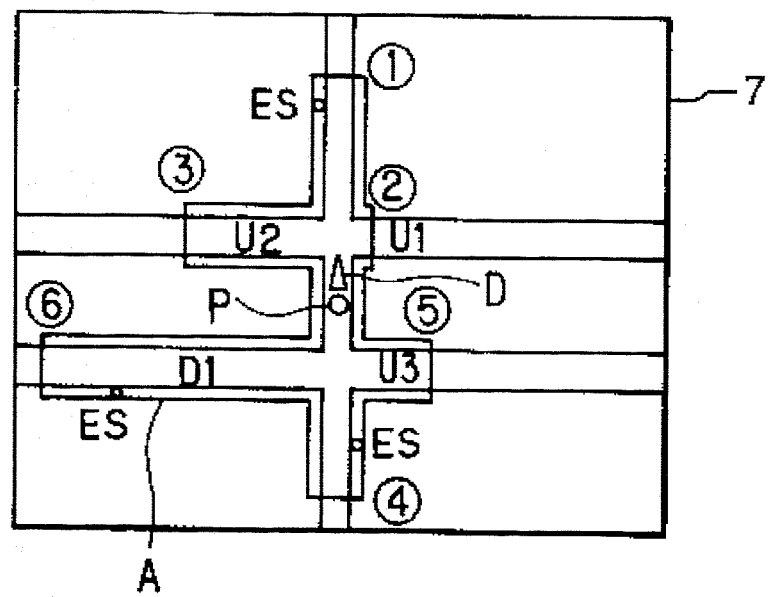
FIG. 5 shows an example of a possible running range of a vehicle from its current location considering topographic features of roads.

After determining the possible running distance of the vehicle in each possible route, the signal processing unit 8 operates to display a possible running range A from the current location P of the vehicle, as shown in FIG. 5, on the road map indicated on the display screen according to the possible running distance calculated for each route.

In FIG. 5, the encircled numerals 1, 2, 3, 4 and 5 designate respective routes processed in the order of their numbers for calculating how far the vehicle can travel thereon with a specified residual battery charge. For instance, the display image indicates that the route No. 2 has a sharply upward slope U1 not allowing the vehicle to climb thereon, the route No. 3 has a relatively gentle slope U2 allowing the vehicle to climb but limiting its running distance shorter in comparison with the case of flat route No. 1, the route No. 5 has a upward slope U3 allowing the vehicle to climb only the midway thereof and the route No. 6 has a downward slope D1 allowing the vehicle to travel longer than the flat route No. 1.

There may be a considerable delay in displaying the possible running range A on the road map if the display is done after determining the possible distances for all routes. Accordingly, in successively processing the routes in the given order of priority, the signal processing unit 8 outputs a possible running distance of the vehicle in one route immediately after calculation to partially illustrate a possible running range on the corresponding route. The partial outputs are made step by step to finally complete a possible running range on the road map indicated on the display screen.

By virtue of this solution, a driver can immediately know how far he can drive the vehicle in a first desired direction.

The data on locations of battery charging stations for electric vehicles are registered in the road-map information storage medium 3 and read out therefrom by the signal processing unit 8 to be displayed, for example, with a mark "ES" within the possible running range A on the road map indicated on the display screen.

In this case, the signal processing unit 8 may guide the driver to drive the vehicle from the current location of the vehicle to a battery charging station through such a route that requires the least consumption of electric energy.

Figure 6:
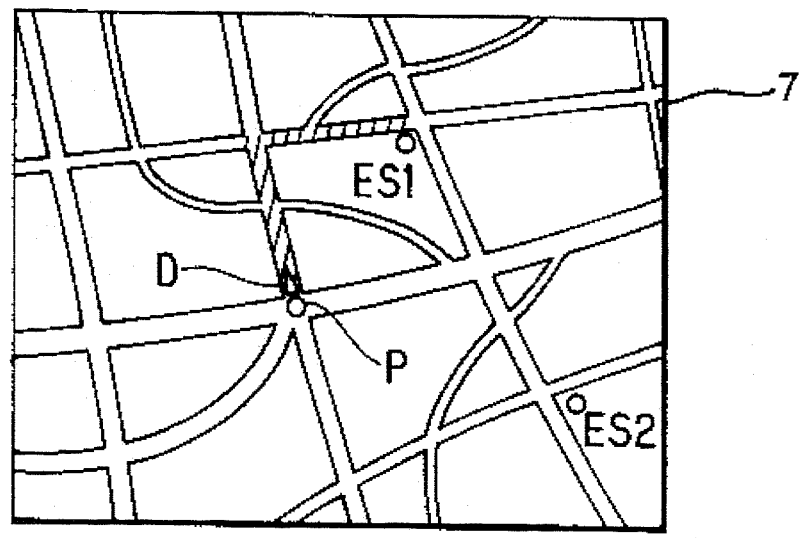
FIG. 6 shows an example of display for guiding the vehicle travel to a battery charging station.

Referring to FIG. 6, there is illustrated a road map image of a possible running range wherein a plurality of battery charging stations ES1 and ES2 exist. In this case, the signal processing unit 8 calculates distances from the current location of the vehicle to the battery charging stations ES1 and ES2 respectively, selects the nearest battery charging station ES1 and extracts all possible routes from the current location of the vehicle to the battery charging station ES1. The signal processing unit 8 determines how much electric energy is consumed for driving the vehicle through each route by calculating digital data of the road map in a way similar to that described above, selects a route requiring the least electric energy and displays the selected route with high-lighting or in a specified color for guiding the driver.

Figure 7:
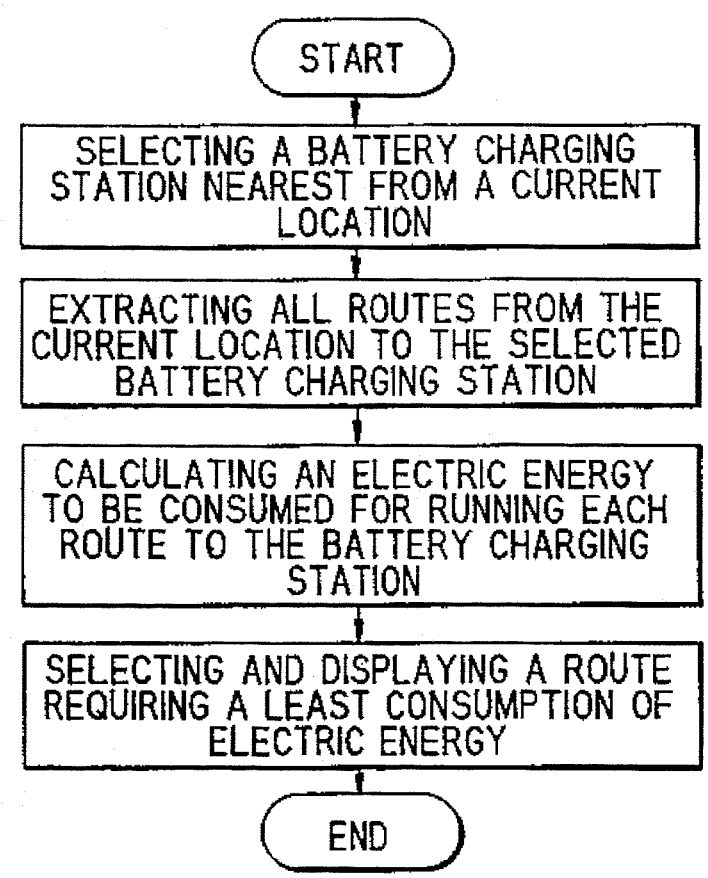
FIG. 7 is a flow chart of processing for displaying a guide to a battery charging station.

FIG. 7 shows a flow chart of processing steps to be performed by the signal processing unit 8 in the above-mentioned case.

This display method can effectively guide the vehicle to a battery charging station through a route requiring a least consumption of electric energy according to the running ability of the vehicle with a reduced battery charge even in an area having up-and-down slopes.

Figure 8:
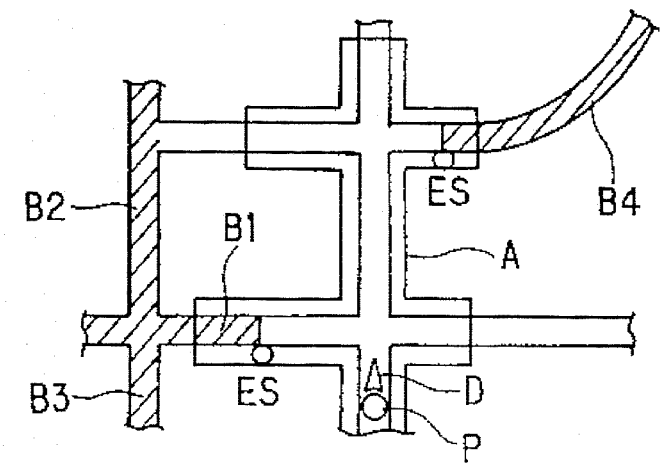
FIG. 8 shows an example of displaying a possible running range of a vehicle after recharging its battery at a battery charging station existing in an area of a current possible running range.

As shown in FIG. 8, in addition to a possible running range A from a current location of the vehicle with a residual battery charge, it is also possible to display possibly running areas B (high-lighted areas B1, B2, B3, . . . ) of the vehicle with a specified (normal) amount of battery charge after being recharged at a battery charging station ES located within the possible running range A.

Furthermore, in the display device according to the present invention, the signal processing unit 8 can also operate to display digital values of running speed measured by a speed sensor (not shown), travelled distance of a vehicle, residual charge of the vehicle's battery and a clock of the signal processing unit 8 on a screen of the display 7.

In this case, a display-mode selector switch of the signal processing unit 8 is used for selectively changing over an image on the screen of the display 7 to metering, navigation (to indicate a current location of the vehicle on a road map), a possible running range and a guidance to a battery charging station one after another.

Figure 9:
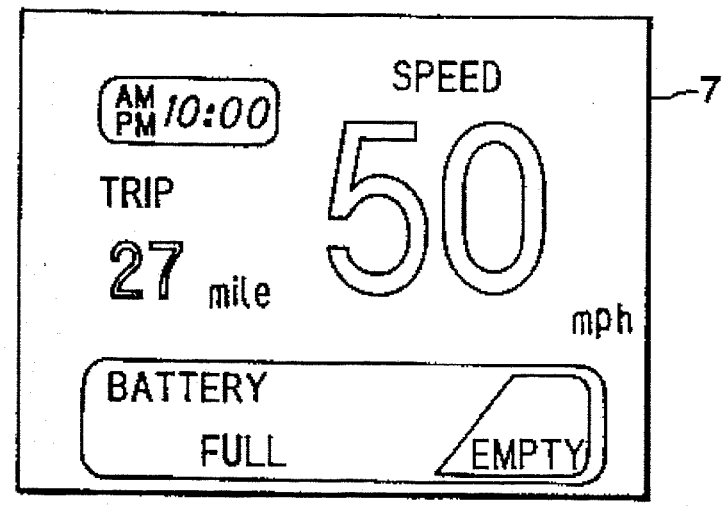
FIG. 9 shows a display indicating a metering image in full screen size.
Figure 10:
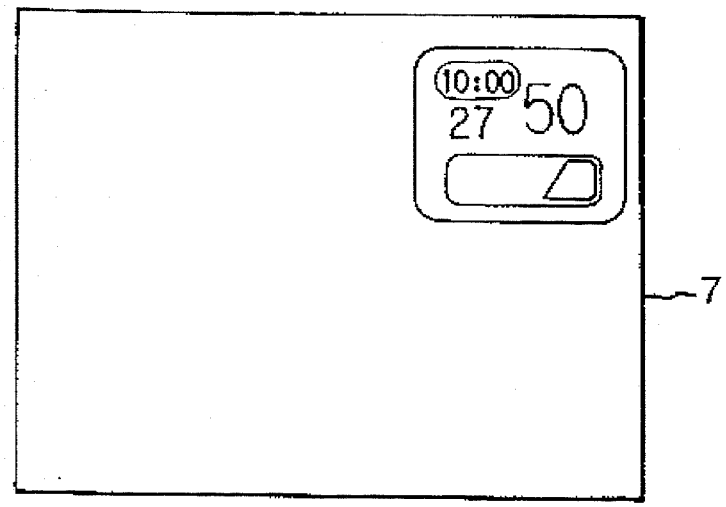
FIG. 10 shows a display indicating a metering image at a corner of its screen.

Referring to FIG. 9, there is shown a display image when a metering display mode is selected. In this mode, a running speed, trip (travelling distance), residual battery charge and current clock time are shown in multi-windows on the whole screen of the display 7. In any other mode, the meter indication in a contracted multi-windows is superimposed at a corner of the image on the display screen as shown in FIG. 10.

Figure 11:
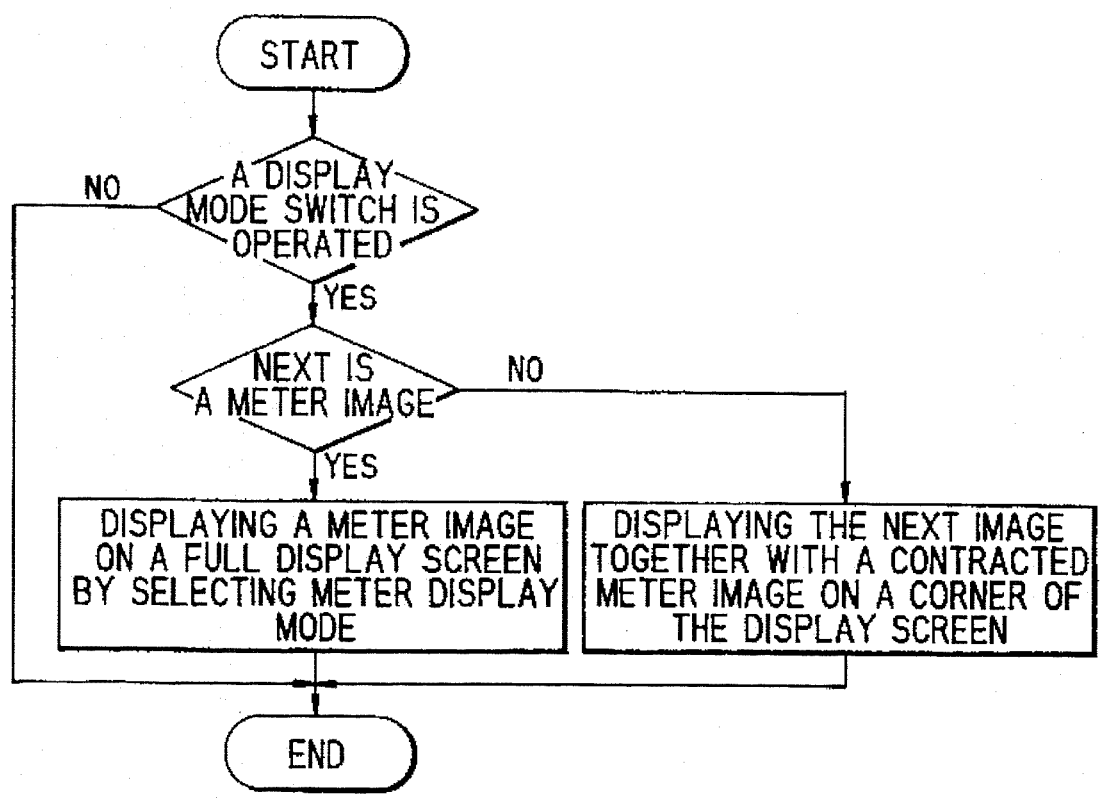
FIG. 11 is a flow chart of processing for changing-over a display image according to an inputting operation.

FIG. 11 shows a flow chart of processing for switching over a display image by the signal processing unit 8.

When the display mode for displaying a possible running range is selected by operating a display-mode selector switch a possible running range of the vehicle depending on a currently detected residual battery charge is renewably displayed. When a residual battery charge is reduced below a given threshold in the other display mode the signal processing unit 8 operates to forcibly change over the display image of the display 7 to an image of a possible cunning range.

Figure 12:
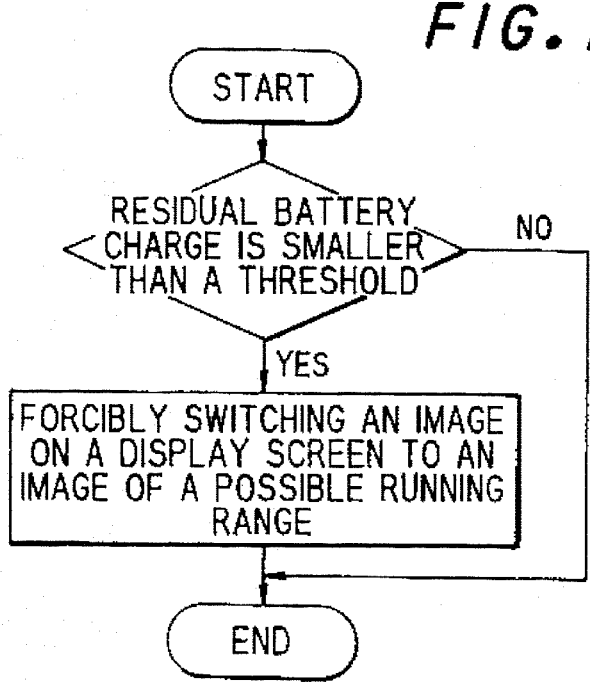
FIG. 12 is a flow chart of processing for forcibly changing-over a display image when a residual charge decreases below a given threshold.

FIG. 12 illustrates a flow chart of the abovementioned processing by the signal processing unit 8.

Figure 13:
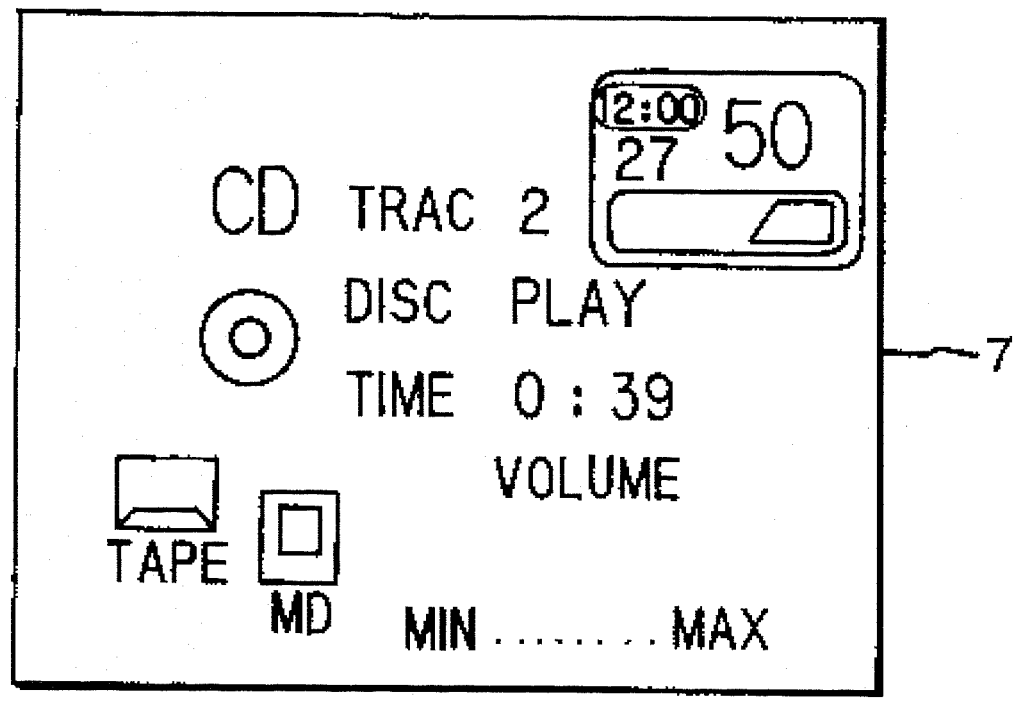
FIG. 13 shows a display screen whereon a music materials' information is indicated.

Referring to FIG. 13, it is also possible to add a music-softwares information mode to the display-mode selector switch of the signal processing unit 8, which is selected for displaying information about music CD, cassette tapes, MD and other medium on the screen of the display 7.

As described above, the present invention provides a display device for an electric vehicle, which offers such an advantage that it can set the true possible running range of the electric vehicle with due regard to the possible slope-climbing ability depending on the residual battery charge on a road map image indicated on a display screen since the possible running distance on each road for the vehicle with a detected residual battery-charge is first determined on the basis of consumption of electric energy necessary for running thereon according to information on topographic features thereof and the possible running range from the location of the vehicle is determined according to the obtained possible running distances.

What is claimed is:

1. A display device for an electric vehicle with a vehicle-driving battery, comprising a display screen; an information storage medium having road map information including roads and topographical features of said roads at least for said current location; means for displaying a road map from said storage medium on said display screen; means for determining a current location of said vehicle; means for displaying said determined current location of said vehicle on said road map displayed on said display screen; means for detecting a residual charge in said vehicle-driving battery; means for determining a possible remaining running distance of said vehicle on the basis of predicted consumption of vehicle-driving battery electric energy by said vehicle running on said detected residual charge of said vehicle-driving battery on a selected road extending from said current location, said determination of the possible remaining running distance being variable with topographic features of said selected road retrieved from said storage medium; means for displaying on said road map a possible remaining running range of said vehicle on said selected road from said current location based on said determined possible remaining running distance of said vehicle.

2. A display device for an electric vehicle according to claim 1, characterized in that a plurality of roads on said road map are successively selected and said possible remaining running distance is determined for each road of said plurality of roads and said possible remaining running range is displayed for each road of said plurality of roads.

3. A display device for an electric vehicle according to claim 2, characterized in that said possible remaining running range for each road is displayed on said road map as said possible running remaining distance is determined for that said road.

4. A display device for an electric vehicle according to claim 1, 2 or 3, characterized in that data on locations of battery charging stations are previously included in said information storage medium and the battery charging stations located within an area of the possible remaining running range of the vehicle are displayed on said road map on said display screen.

5. A display device for an electric vehicle according to claim 4, characterized in that the possible remaining running range of said vehicle with said residual battery charge, starting from said current location, together with a further possible remaining running range of said vehicle after being recharged at a said battery charging station is determined and displayed on said road map.

6. A display device for an electric vehicle according to claim 2 or 3, including means for detecting a running direction of said vehicle; means for determining an order of priority for selecting each road on the road map for determining said possible remaining running distance with a first priority given to the road on which said vehicle is currently running and in said detected running direction, successive priorities are assigned based first on said current running direction and then on roads in a direction opposite to said current running direction, and a possible remaining running range from the current location of said vehicle is displayed on the road map for each selected road according to the order of priority.

7. A display device for an electric vehicle, comprising means for detecting a current location of the vehicle; means for displaying said detected current location of the vehicle on a road map which is indicated on a display screen according to map information read from a storage medium; means for detecting a residual charge in a battery for driving the vehicle; means for determining a possible remaining running distance of the vehicle on the basis of predicted consumption of vehicle battery electric energy when the vehicle runs with the detected residual charge in said battery on roads extending from said current location, said determination of the possible remaining running distance being variable with topographic features of said roads specified according to topographic information of each road on the road map, which road map is read from the storage medium; means for displaying on the road map a possible remaining running range of the vehicle from said current location, which possible remaining running range is determined on the basis of the determined possible remaining running distance of the vehicle.

8. A display device for an electric vehicle according to claim 7, characterized in that a slope of each road on the road map is determined from information on aid topographic features of each said road, a road having a slope which the vehicle can run with the detected residual charge in said battery is selected, and a possible remaining running distance of the vehicle on the selected road is determined.

9. A display device for an electric vehicle according claim 7 or 8, characterized in that data on locations of battery charging stations are previously included in said map information and the battery charging stations located within an area of the possible remaining running range of the vehicle are indicated on the road map.

10. A display device for an electric vehicle according to claim 9, characterized in that the possible remaining running range of the vehicle with its residual battery charge, starting from its current location, together with a further possible running range of the vehicle after being recharged at a battery charging station is displayed on the road map.

11. A display device for an electric vehicle according to claim 7 or 8, characterized in that means for detecting a running direction of the vehicle is provided, an order of priority is given to each road on the road map with reference to a first priority road whereon the vehicle is currently running, and said possible remaining running range from the current location of the vehicle is displayed on the road map according to the order of priority.

* * * * *